(12) United States Patent
Fromentin et al.

(10) Patent No.: US 12,539,680 B2
(45) Date of Patent: Feb. 3, 2026

(54) COMPOSITE MOLD FOR MANUFACTURING A MICROSTRUCTURED THERMOSET ARTICLE, MANUFACTURING METHOD AND METHOD FOR OBTAINING THE MOLD

(71) Applicant: Essilor International, Charenton-le-Pont (FR)

(72) Inventors: Pierre Fromentin, Bangkok (TH); Haifeng Shan, Shrewsbury, MA (US)

(73) Assignee: Essilor International, Charenton-le-Pont (FR)

( * ) Notice: Subject to any disclaimer, the term of this patent is extended or adjusted under 35 U.S.C. 154(b) by 115 days.

(21) Appl. No.: 18/563,150

(22) PCT Filed: May 25, 2022

(86) PCT No.: PCT/EP2022/064212
§ 371 (c)(1),
(2) Date: Nov. 21, 2023

(87) PCT Pub. No.: WO2022/248557
PCT Pub. Date: Dec. 1, 2022

(65) Prior Publication Data
US 2024/0227332 A1    Jul. 11, 2024

(30) Foreign Application Priority Data
May 26, 2021   (EP) .................................. 21305684

(51) Int. Cl.
*B29D 11/00*   (2006.01)
*B29C 33/42*   (2006.01)
*B29C 33/58*   (2006.01)
*B29C 33/62*   (2006.01)
*B29C 39/02*   (2006.01)
*B29C 39/26*   (2006.01)
*B29K 101/10*  (2006.01)
*B29L 11/00*   (2006.01)

(52) U.S. Cl.
CPC ........ *B29D 11/0048* (2013.01); *B29C 33/424* (2013.01); *B29C 33/58* (2013.01);
(Continued)

(58) Field of Classification Search
CPC ................................................ B29C 11/00548
See application file for complete search history.

(56) References Cited

U.S. PATENT DOCUMENTS 5,096,626 A    3/1992  Takamizawa et al.
6,491,851 B1 * 12/2002 Keller .................. B29C 39/025
                                                    264/1.32
(Continued)

FOREIGN PATENT DOCUMENTS

EP          3730270    10/2020
WO    WO 1999/029494    6/1999

OTHER PUBLICATIONS

International Search Report and Written Opinion issued in corresponding PCT Application No. PCT/EP2022/064212, mailed Aug. 30, 2022.

*Primary Examiner* — Benjamin A Schiffman
(74) *Attorney, Agent, or Firm* — Norton Rose Fulbright US LLP (57) ABSTRACT

A composite mold for manufacturing a thermoset optical article which is usable as an ophthalmic lens substrate and which comprises a microstructured main surface, to a method for manufacturing such a thermoset optical article, and to a method for obtaining the composite mold. The composite mold (1) comprises:—a mineral first outer mold part (2) having a first inner surface (2a), and—an organic molding film (4) detachably bonded to the first inner surface (2a) and having a microstructured pattern configured to (Continued)

directly form said microstructured main surface after casting the thermosetting material (6) in contact with the organic molding film (4). The organic molding film (4) is hydrophobic at least on said microstructured pattern, and has a thickness of between 10 nm and $500_{1\text{-}1}$m.

19 Claims, 3 Drawing Sheets

(52) U.S. Cl.
CPC ............ *B29C 33/62* (2013.01); *B29C 39/026* (2013.01); *B29C 39/26* (2013.01); *B29D 11/00317* (2013.01); *B29D 11/00326* (2013.01); *B29D 11/00519* (2013.01); *B29D 11/00548* (2013.01); *B29D 11/00865* (2013.01); *B29K 2101/10* (2013.01); *B29L 2011/0016* (2013.01)

(56) References Cited

U.S. PATENT DOCUMENTS

| | | | |
|---|---|---|---|
| 7,028,974 B1* | 4/2006 | Chiba | B29D 11/00413 |
| | | | 425/117 |
| 11,852,784 B2* | 12/2023 | Fromentin | B29D 11/0048 |
| 12,138,872 B2* | 11/2024 | Feuillade | B29D 11/00432 |
| 12,226,968 B2* | 2/2025 | Shan | B29D 11/0073 |
| 12,358,244 B2* | 7/2025 | Chiu | B29C 33/0038 |
| 2020/0183053 A1 | 6/2020 | Fromentin et al. | |
| 2020/0241174 A1* | 7/2020 | Fromentin | G02B 1/14 |
| 2021/0109379 A1 | 4/2021 | Guillot et al. | |
| 2021/0356769 A1* | 11/2021 | Jallouli | B29D 11/00009 |
| 2021/0370553 A1* | 12/2021 | Toyoshima | B29D 11/00528 |
| 2022/0276409 A1* | 9/2022 | Chiu | B29D 11/00009 |
| 2024/0308161 A1* | 9/2024 | Ikizer | B29D 11/0048 |
| 2024/0316846 A1* | 9/2024 | French | B29D 11/00326 |
| 2025/0010561 A1* | 1/2025 | Chiu | B29D 11/0049 |
| 2025/0058535 A1* | 2/2025 | Jallouli | B29D 11/0073 |
| 2025/0083401 A1* | 3/2025 | Kongtara | B29C 33/60 |

* cited by examiner

COMPOSITE MOLD FOR MANUFACTURING A MICROSTRUCTURED THERMOSET ARTICLE, MANUFACTURING METHOD AND METHOD FOR OBTAINING THE MOLD

CROSS-REFERENCE TO RELATED APPLICATIONS

This application is a national phase application under 35 U.S.C. § 371 of International Application No. PCT/EP2022/064212 filed 25 May 2022, which claims priority to European Patent Application No. 21305684.9 filed 26 May 2021. The entire contents of each of the above-referenced disclosures is specifically incorporated by reference herein without disclaimer.

FIELD OF THE INVENTION

The present invention relates to a composite mold for manufacturing a thermoset optical article which is usable as an ophthalmic lens substrate and which comprises a microstructured main surface, to a method for manufacturing such a thermoset optical article, and to a method for obtaining the composite mold. The invention particularly applies to an ophthalmic lens comprising a microstructure configured to control myopia.

DESCRIPTION OF RELATED ART

In a known manner, thermoset ophthalmic lens substrates which incorporate a microstructured main surface may be cast into a cavity of a mineral glass mold, an inner surface of which is provided with a microstructure pattern configured to impart the desired microstructures to the main surface of the cast thermosetting material, after curing thereof.

A major drawback of such a casting method is that microstructured mineral molds are often finally scrapped for getting damaged over use due to repeated cleaning and/or re-polishing treatments to suppress contaminations originating from successive demoldings of thermoset materials, these molds being sometimes broken if operators do not manipulate them properly. The scrapping/breaking rates can reach as high values as 0.3% of the used microstructured molds. Considering their very high cost, the Applicant formerly sought to overcome this drawback.

WO 99/29494 A1 relates to a method for obtaining an ophthalmic lens comprising a surface utility microstructure, consisting in a step for transferring the microstructure into the lens surface from a mold, the internal surface of which bears the microstructure and has a sight correcting geometric design. The mold may be a composite mold comprising a metal or plastic insert having a surface in which the utility microstructure is formed, said insert suiting preferably by an adhesive to the mold surface having the sight-correcting geometry, which may be made of mineral glass. The insert may be initially shaped so as to have the required sight-correcting geometry and be secured to the corresponding mold surface, or have initially a plane shape and be then distorted to suit to the mold sight-correcting geometry surface.

A drawback of such a method coating the internal surface of the mold with a metal or plastic insert may reside in that this glued insert may not in some cases:

sufficiently conform to the microstructure of the mineral glass mold, particularly because of the relatively thick insert which is glued, fully (i.e. chemically and thermally) resist the casting of the thermosetting material of the ophthalmic lens, and be easily releasable from the mold surface and/or the thermosetting material after casting and curing the same into the mold, because of a too good adhesion between the insert and any of the mold surface and this cast material.

SUMMARY OF THE INVENTION

An object of the invention is to overcome at least the above-mentioned drawbacks, by providing a composite mold for manufacturing a thermoset optical article which is usable as an ophthalmic lens substrate and which comprises a microstructured main surface, by casting a thermosetting material into a molding cavity, the composite mold comprising:

a mineral first outer mold part having a first inner surface, and an organic molding film detachably bonded to the first inner surface and having a microstructured pattern configured to directly form said microstructured main surface after casting the thermosetting material in contact with the organic molding film.

This aim is achieved in that the inventors have just discovered that if a specific organic molding film is combined in a determined way to this mineral first outer mold part, then it is possible to obtain a composite mold which better protects this mineral first outer mold part from the repeatedly cast, cured and demolded thermosetting materials so as to increase durability of said mineral mold part, and particularly improves the releasability (i.e. ability of being easily disassembled from the composite mold during the final demolding step) of the cast and cured thermoset articles from the composite mold, whilst keeping the originally designed pattern of the microstructures designed in the composite mold.

According to the invention, the organic molding film is hydrophobic at least on said microstructured pattern, and has a thickness of between 10 nm and 500 μm.

It is to be noted that this arrangement of the organic molding film and of the mineral first outer mold part allows to protect, like a shielding membrane, said mineral first outer mold part to which this film is detachably bonded (i.e. removably attached) by preventing any contact between the cast and cured thermosetting material and the mineral first outer mold part.

As a result, damages over use due to repeated harsh cleaning and re-polishing treatments to suppress contaminations originating from repeated casting-curing-demoldings steps (which demolding steps are indeed very demanding for the first inner surface of the mineral first outer mold part) are avoided, and as a consequence scrapping of such mineral first outer mold parts which are very costly particularly when they incorporate the original microstructures, are minimized or at least significantly delayed.

It is also to be noted that the composite mold of the invention allows to impart further improvements to the thermoset microstructured lens material, thanks to the organic molding film which is configured to satisfactorily conform to the microstructures that may be designed in the mineral first outer mold part particularly thanks to its low thickness, whilst being easily releasable from both the mineral first outer mold part and the cast thermoset material particularly thanks to its application technique and hydrophobicity, thus providing a good conformational molding/demolding ability for the microstructured pattern.

It may further be noted that the organic molding film of the invention may be either of monolayer or multilayer type, and may be:
fully hydrophobic (i.e. through its entire thickness), or
only hydrophobic on an inner surface layer of the organic molding film defining said microstructured pattern designed to be in contact with the thermosetting material to be cast, this hydrophobic inner surface layer being possibly obtained by spray coating on the underlying organic layer which is possibly hydrophilic or less hydrophobic, as explained below.

Preferably, the organic molding film of this composite mold exhibits a water contact angle greater than 100°, preferably greater than 110°, and more preferably greater than 120° (which witnesses a significantly high hydrophobicity) at least on said microstructured pattern, and/or has a thickness of between 1 µm and 100 µm, more preferably of between 10 µm and 90 µm.

As mentioned above, this high hydrophobicity of the organic molding film at least on its microstructured inner surface layer is specifically designed to further ease the demolding step of the thermoset material cast in contact with this microstructured inner surface layer, thus allowing to satisfactorily release the thermoset article from the composite mold.

According to other advantageous features of the invention, the organic molding film may be based on at least one polymer selected from elastomers, thermoplastic polymers and thermoset polymers, and preferably has a Young modulus, measured according to ASTM D882-12, of between 100 MPa and 4000 MPa and preferably of between 200 MPa and 2000 MPa.

According to a first embodiment of the invention, the organic molding film is based on at least one crosslinked elastomer which, in the above case of a fully hydrophobic organic molding film, is preferably selected from silicone rubbers, such as two-part polydimethylsiloxanes (PDMS), and from polyurethane rubbers, such as two-part liquid urethane rubbers.

According to a second embodiment of the invention, the organic molding film is based on at least one thermoset polymer which, in the above case of a fully hydrophobic organic molding film, is preferably selected from thiol-ene thermosets such as one-part liquid photopolymer adhesives, and from thermoset polyurethanes.

According to a third embodiment of the invention, the organic molding film is based on at least one thermoplastic polymer which, in the above case of a fully hydrophobic organic molding film, is preferably selected from fluorinated polymers, such as terpolymers of tetrafluoroethylene, hexafluoropropylene and vinylidene fluoride, and from thermoplastic polyurethanes (TPU).

According to these three embodiments of the invention, the organic molding film may alternatively be based on the at least one crosslinked elastomer, thermoset polymer or thermoplastic polymer as defined above, which may not be hydrophobic in view of the hydrophobic inner surface layer of the film which may be spray coated on the polymer underlying layer(s) of the film.

According to another aspect of the invention, the mineral first outer mold part, which is for example made of mineral glass, may have said first inner surface which comprises a microstructure onto which a first face of the organic molding film is detachably bonded without an adhesive therebetween, the organic molding film conforming to the microstructure on the first face and having an opposite second face forming said microstructured pattern, and the composite mold further comprises a mineral second outer mold part which has a second inner surface opposite to the first inner surface, the molding cavity being defined between the organic molding film and the second inner surface.

It may be noted that the mineral first outer mold part may comprise or be made of mineral materials other than mineral glass, such as metal materials or non-metallic materials which are not of plastic type (e.g. not of organic polymeric type).

It may also be noted that according to the above-mentioned aspect where the mineral first outer mold part comprises said microstructure onto which the organic molding film is detachably bonded (not adhesively bonded), the bonding interface between the mineral first outer mold part and the film (which may involve a chemical bond or not) is selected to be weak enough or at most implying a medium adhesion, so as to subsequently easily detach the film from the mineral first outer mold part after casting and curing the thermosetting material in the molding cavity.

According to a preferred embodiment of the invention which may be common to all the foregoing features thereof, the first inner surface of the mineral first outer mold part which comprises said microstructure onto which the organic molding film is detachably bonded (not adhesively bonded), may have said first inner surface which is concave (even though another geometry might be usable), and the thickness of the organic molding film may range from $1/10$ to $1/100$ of the average amplitude of said microstructure of the mineral first outer mold part (even more preferably from $1/20$ to $1/50$ of the average amplitude of said microstructure).

It may be noted that this thickness ratio for the organic molding film versus the average amplitude of said microstructure allows not to affect the optics of the original microstructure as designed.

Another object of the invention is to provide a method for manufacturing a thermoset optical article which is usable as an ophthalmic lens substrate and which comprises a microstructured main surface for example configured to control myopia, the method being easy to implement and able to impart excellent chemical and mechanical properties to the composite mold in view of the casting, curing and demolding steps.

According to the invention, this manufacturing method comprises:
a) casting a thermosetting material into a molding cavity of a composite mold as defined above, so that the thermosetting material contacts the organic molding film and a second inner surface of a mineral second outer mold part which is opposite to the first inner surface, without contacting said first inner surface,
b) curing the thermosetting material cast in the molding cavity; and
c) demolding the molded thermoset material obtained in step b), comprising releasing the molded thermoset material from the organic molding film, so that the microstructured pattern of the organic molding film directly forms the microstructured main surface of the obtained thermoset optical article.

It is to be noted that said second inner surface of the composite mold which is in contact with the cast thermosetting material belongs to the complementary mineral second outer mold part, which is part of the composite mold that it closes in operation together with the mineral first outer mold part. This second mineral inner surface, which may be convex in relation to the above-mentioned concave first inner surface, is for example made of mineral glass (even though other mineral materials may be used).

It may also be noted that the manufactured thermoset optical article is advantageously designed to form a substrate of an ophthalmic lens which may be a corrective spectacle lens for instance usable to treat or control not only myopia, but also hyperopia, astigmatism and presbyopia.

Preferably, the organic molding film is chosen to resist attack during casting step a) from the thermosetting material, which is selected from:
- cycloolefin copolymers such as ethylene/norbornene or ethylene/cyclopentadiene copolymers,
- homopolymers and copolymers of allyl carbonates of linear or branched aliphatic or aromatic polyols, such as homopolymers of diethylene glycol bis(allyl carbonate),
- homopolymers and copolymers of (meth)acrylic acid and esters thereof, which are optionally derived from bisphenol A,
- homopolymers and copolymers of thio(meth)acrylic acid and esters thereof,
- homopolymers and copolymers of allyl esters which are optionally derived from bisphenol A or phthalic acids, and allyl aromatics such as styrene,
- copolymers of urethane and thiourethane,
- homopolymers and copolymers of epoxy, and
- homopolymers and copolymers of sulfide, disulfide and episulfide.

More preferably, the organic molding film is chosen to avoid attack during casting step a) from the thermosetting material, which is:
- a homopolymer or copolymer of an allyl carbonate of a linear or branched aliphatic or aromatic polyol, even more preferably an homopolymer of diethylene glycol bis(allyl carbonate) such as of Orma® name, or
- a polythiourethane copolymer, such so-called "MR8", "MR"7 and "1.74" lenses.

According to another aspect of the invention, a method for obtaining a composite mold as defined above comprises:
A) Providing a polymer composition which is either hydrophobic or coated with a hydrophobic surface layer and which is capable of forming the organic molding film to be detachably bonded to the mineral first outer mold part, the polymer composition being able to resist attack from the thermosetting material to be cast,
B) Applying the polymer composition on the inner surface of the mineral first outer mold part, to form a precursor layer for the organic molding film, and
C) Treating the applied precursor layer to form the organic molding film, which has said thickness of between 10 nm and 500 µm, preferably of between 1 µm and 100 µm, and a surface tension able to release therefrom the cast and cured thermoset optical article.

Said inner face of the mineral first outer mold part, which is for example formed of mineral glass, comprises a microstructure onto which the organic molding film is conformingly bonded in steps B) and C), to form said microstructured pattern.

According to a first exemplary embodiment of the invention, the polymer composition consists of a solution comprising a solvent and at least one polymer selected from elastomers, thermoplastic polymers and thermoset polymers, and step B) comprises coating the solution on the inner surface of the mineral first outer mold part preferably by spin coating, spray coating, or dip coating.

Pursuant to this first exemplary embodiment of the invention, step C) may comprise:
- crosslinking (e.g. by curing) the precursor layer for example under heat and/or UV radiation, preferably in case the at least one polymer is selected from elastomers and thermoset polymers, or
- evaporating the solvent, preferably in case the at least one polymer is selected from thermoplastic polymers and is spin-coated in step B).

According to a second exemplary embodiment of the invention, in case the hydrophobic polymer composition is devoid of a solvent and preferably when the at least one polymer is selected from thermoplastic polymers, steps B) and C) comprise micro-thermoforming the hydrophobic polymer composition using pressure and/or vacuum by compression against the microstructure of said inner face of the mineral first outer mold part.

It may be noted that these methods of the invention for obtaining the composite mold advantageously allow to replicate at a high fidelity the original microstructure shape of the mineral first outer mold part, whilst providing a medium adhesion therewith for detachability.

In the present description, the microstructures which form the microstructured main surface of an ophthalmic lens substrate may include lenslets. Lenslets may form bumps and/or recesses at the main surface they are arranged onto. The outline of the lenslets may be round or polygonal, for example hexagonal.

More particularly, lenslets may be microlenses. A microlens may be spherical, toric, or have an aspherical shape, rotationally symmetrical or not. A microlens may have a single focus point, or cylindrical power, or non-focusing point.

In preferred embodiments, lenslets or microlenses can be used to prevent progression of myopia or hyperopia. In that case, the base lens substrate comprises a base lens providing an optical power for correcting myopia or hyperopia, and the microlenses or the lenslets may provide respectively an optical power greater than the optical power of the base lens if the wearer has myopia, or an optical power lower than the optical power of the base lens if the wearer has hyperopia.

Lenslets or microlenses may also be Fresnel structures, diffractive structures defining each a Fresnel structure, permanent technical bumps or phase-shifting elements. It can also be a refractive optical element such as microprisms and a light-diffusing optical element such as small protuberances or cavities, or any type of element generating roughness on the substrate. It can also be π-Fresnel lenslets as described in US2021109379 A1, i.e. Fresnel lenslets which phase function has π phase jumps at the nominal wavelength, as opposition to unifocal Fresnel lenses which phase jumps are multiple values of 2π. Such lenslets include structures that have a discontinuous shape. In other words, the shape of such structures may be described by an altitude function, in terms of distance from the base level of the main surface of the ophthalmic lens the lenslet belongs to, which exhibits a discontinuity, or which derivative exhibits a discontinuity.

Lenslets may have a contour shape being inscribable in a circle having a diameter greater than or equal to 0.5 micrometers (µm) and smaller than or equal to 1.5 millimeters (mm).

Lenslets may have a height, measured in a direction perpendicular to the main surface they are arranged onto, that is greater than or equal to 0.1 µm and less than or equal to 50 µm.

The main surface can be defined as a surface, that can be a plano, spherical, sphero-cylindrical or even complex surface, that includes the central point of every microstructures.

This main surface can be a virtual surface, when microstructures are embedded in the lens or close or identical to the ophthalmic lens physical outer surfaces when microstructures are not embedded. The height of the microstructure can be then determined using local perpendicular axis to this main surface, and calculating for the each point of the microstructure the difference between the maximum positive deviation minus the minimum negative deviation to the main surface, along the axis.

Lenslets may have periodical or pseudo periodical layout, but may also have randomized positions. Exemplary layouts for lenslets may be a grid with constant grid step, honeycomb layout, multiple concentric rings, contiguous e.g. no space in between microstructures.

These structures may provide optical wave front modification in intensity, curvature, or light deviation, where the intensity of wave front is configured such that structures may be absorptive and may locally absorb wave front intensity with a range from 0% to 100%, where the curvature is configured such that the structure may locally modify wave front curvature with a range of +/−20 Diopters, and light deviation is configured such that the structure may locally scatter light with angle ranging from +/−1° to +/−30°.

A distance between structures may range from 0 (contiguous) to 3 times the structure (separate microstructures).

In the present description, the terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about." Also unless otherwise indicated, the indication of an interval of values «from X to Y» or "between X to Y", according to the present invention, means as including the values of X and Y.

Figure 1:
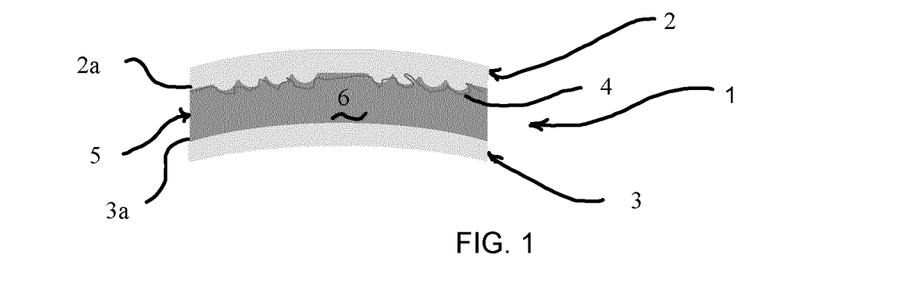
FIG. 1 is a schematic partial sectional view of a composite mold according to a preferred embodiment of the invention, with the thermosetting material filling the mold cavity.

FIG. 1 diagrammatically shows a composite mold 1 according to an exemplary embodiment of the invention, which particularly comprises:

a microstructured mineral first outer mold part 2 (e.g. concave and of mineral glass) on a first microstructured inner surface 2a thereof, a mineral second outer mold part 3 (e.g. convex and also of mineral glass) having a complementary and smooth second inner surface 3a, an organic molding film 4 which is configured to protect the microstructured mineral first outer mold part 2 and which conformingly coats (at a high replicating fidelity) the first microstructured inner surface 2a, and a molding cavity 5 defined between the organic molding film 4 and the second inner surface 3 and which is configured to be filled by the cast thermosetting material 6 to be cast and then cured in this cavity 5 at a determined temperature, for a certain duration.

As explained above, due to the excellent chemical and thermal resistance selected for the film 4, the Applicant has established that both the film 4 and the underlying first microstructured inner surface 2a of the mineral first outer mold part 2 experience no damage.

After completing curing of the cast thermosetting material 6, the resulting thermoset article, such as a lens substrate configured to control myopia, is easily released from the film 4, which is itself easily detached from this mineral inner surface 2a.

As also explained above, the thickness of the organic molding film 4 preferably ranges from $\frac{1}{10}$ to $\frac{1}{100}$ of the average amplitude of the microstructured inner surface 2a of the mineral first outer mold part 2, which allows not to affect the optics of the microstructure.

The organic molding film 4 is selected to be hydrophobic, preferably exhibiting a water contact angle greater than 120° at least on its microstructured inner surface designed to be in contact with the thermosetting material 6 to be cast, the low surface tension of the film 4 enabling to easily demold the casted and cured article.

The film 4 is further selected to have a thickness of between 10 nm and 500 μm, to be able to replicate the original microstructure on the mineral inner surface 2a at a high fidelity.

The film 4 is furthermore selected to exhibit a medium adhesion with the mineral first outer mold part 2 (e.g. of mineral glass), to maintain a long-term production duration, so as to be easily detachable from the mineral first outer mold part 2 to repair or clean the same.

As explained above, the film 4 preferably exhibits a medium Young modulus (of between 100 MPa and 4000 MPa) to protect the mineral first outer mold part 2 from impacts.

Figure 2A:
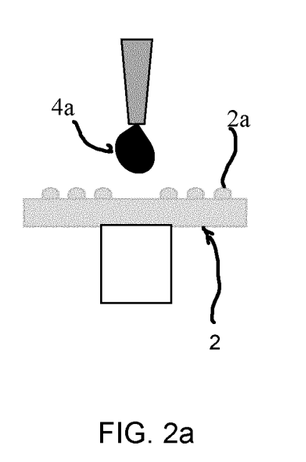
FIGS. 2a-2e show steps of a schematic block diagram of a method according to a first embodiment of the invention for obtaining an organic molding film by spin coating a polymeric solution.
Figure 2B:
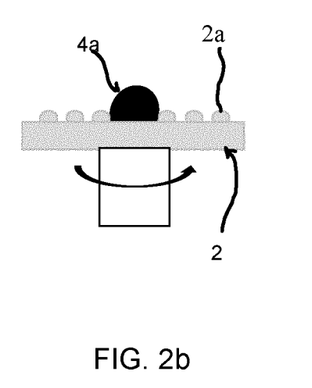
Figure 2C:
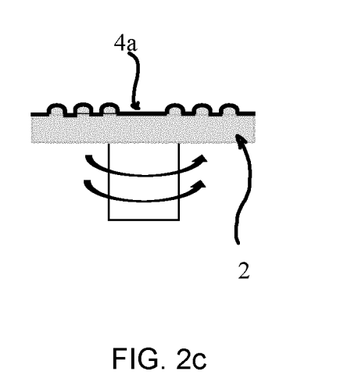
Figure 2D:
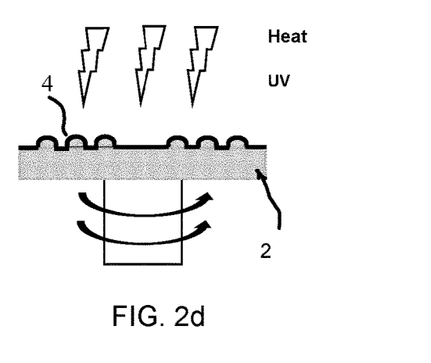
Figure 2E:
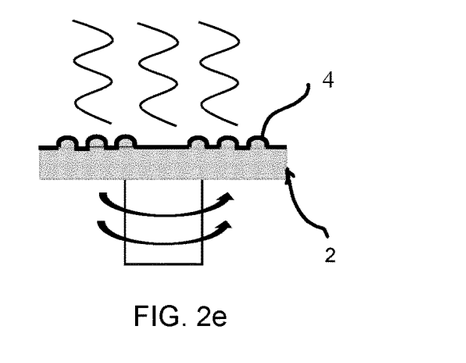

In the schematic block diagram of FIGS. 2a-2e which relates to an organic molding film 4 able to be applied as a polymeric solution by spin coating:

FIG. 2a shows an initial step of depositing the polymeric solution 4a onto the mineral microstructured inner surface 2a (where the solution is based on at least one elastomer, thermoplastic polymer or thermoset polymer), FIG. 2b shows the rotational spreading out of the deposited solution 4a, FIG. 2c shows the formation of a thin liquid precursor 4a of the film 4 on the mineral microstructured inner surface 2a, and FIG. 2d or alternatively 2e show the final formation of the film 4, either by curing under UV or heat (see FIG. 2d), or by solvent evaporation (see FIG. 2e).

Figure 3A:
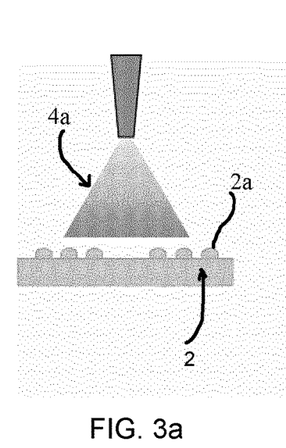
FIGS. 3a-3c show steps of a schematic block diagram of a method according to another embodiment of the invention for obtaining an organic molding film by spray coating a polymeric solution.
Figure 3B:
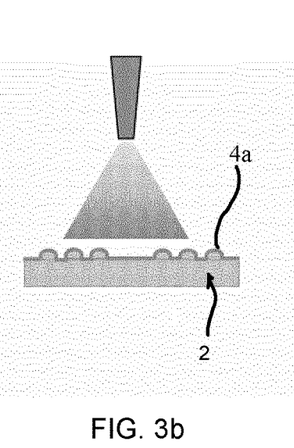
Figure 3C:
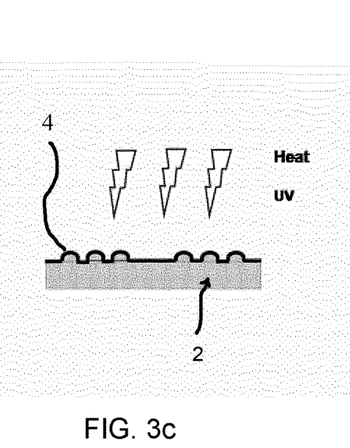

In the schematic block diagram of FIGS. 3a-3c which relates to an organic molding film 4 able to be applied as a polymeric solution by spray coating:

FIG. 3a shows an initial spraying step of the polymeric solution 4a onto the mineral microstructured inner surface 2a (where the solution is based on at least one elastomer, thermoplastic polymer and thermoset polymer), FIG. 3b shows the subsequent formation of a precursor liquid film 4a on the mineral microstructured inner surface 2a, and FIG. 3c shows the final formation of the film 4 by curing under heat or UV.

Figure 4A:
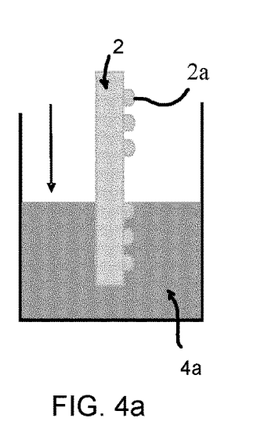
FIGS. 4a-4c show steps of a schematic block diagram of a method according to another embodiment of the invention for obtaining an organic molding film by dip coating a polymeric solution.
Figure 4B:
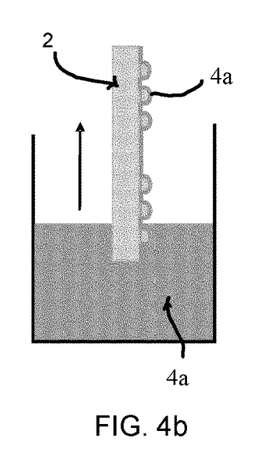
Figure 4C:
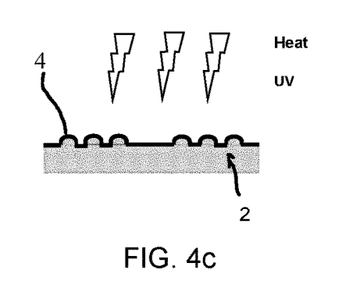

In the schematic block diagram of FIGS. 4a-4c which relates to an organic molding film 4 able to be applied as a polymeric solution by dip coating:

FIG. 4a shows an initial dipping step of the mineral first outer mold part 2 into the polymeric solution 4a, FIG. 4b shows the formation of a precursor liquid film 4a on the mineral microstructured inner surface 2a, and FIG. 4c shows the final formation of the film 4 by curing under heat or UV.

Figure 5A:
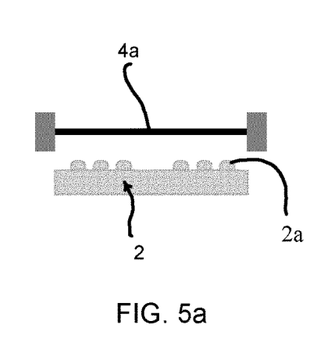
FIGS. 5a-5c show steps of a schematic block diagram of a method according to another embodiment of the invention for obtaining an organic molding film by micro-thermoforming under pressure.
Figure 5B:
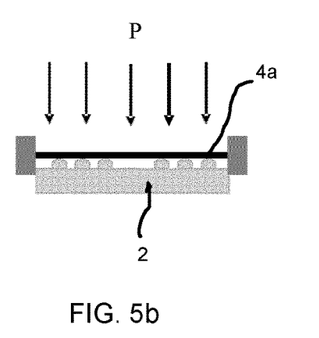
Figure 5C:
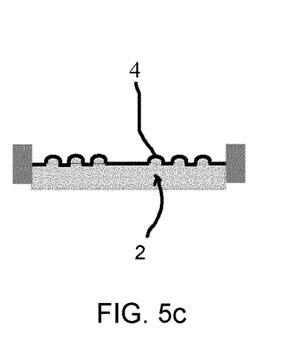

In the schematic block diagram of FIGS. 5a-5c which relates to an organic molding film 4 able to be applied as a thin membrane via a micro-thermoforming technique by pressure:

FIG. 5a shows an initial step of assembling a precursor 4a of the film 4,

FIG. 5b shows a subsequent step of applying air pressure P to conform the precursor 4a of the film 4 onto the mineral inner surface 2a of the mineral first outer mold part 2a, and FIG. 5c shows the final step of forming the film 4 detachably bonded to the inner surface 2a.

Figure 6A:
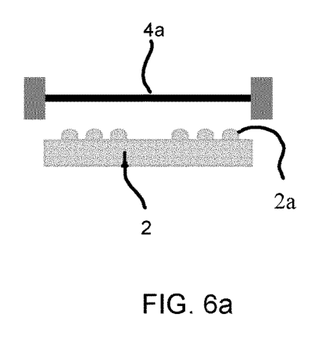
FIGS. 6a-6c show steps of a schematic block diagram of a method according to another embodiment of the invention for obtaining an organic molding film by micro-thermoforming under vacuum.
Figure 6B:
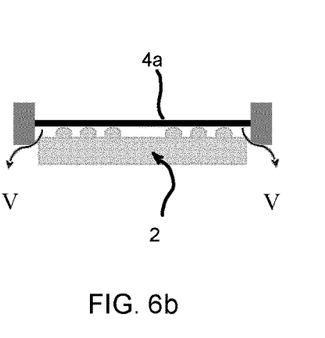
Figure 6C:
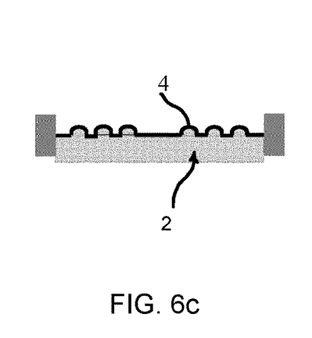

In the schematic block diagram of FIGS. 6a-6c which relates to an organic molding film 4 able to be applied as a thin membrane via a micro-thermoforming technique by vacuum:

FIG. 6a shows an initial step of assembling a precursor 4a of the film 4,

FIG. 6b shows a subsequent step of applying vacuum V to conform the precursor 4a of the film 4 onto the mineral inner surface 2a of the mineral first outer mold part 2a, and FIG. 6c shows the final step of forming the film 4 detachably bonded to the inner surface 2a.

EXAMPLES OF COMPOSITE MOLDS AND METHODS OF THE INVENTION

The following examples illustrate the present invention in a more detailed, but non-limiting manner.

Example 1: PDMS-Based Molding Film Applied by Spin Coating

A two-part PDMS according to table 1 below was used for the film 4, according to the following features:

PDMS: Sylgard® 184, from Dow Chemical;

preparation of the polymeric solution: PDMS parts A and B were mixed in a 10:1 (wt:wt) ratio and stirred for 2 minutes, and the mixture was then placed in vacuum desiccators for degassing (10-13 minutes) before use.

TABLE 1

| Property | Unit | Result |
|---|---|---|
| One or Two Part | | Two |
| Color | | Colorless |
| Viscosity (Base) | Pa-sec | 5.1 |
| Viscosity (Mixed) | Pa-sec | 3.5 |
| Thermal Conductivity | W/(m*° K) | 0.27 |
| Specific Gravity (Cured) | | 1.03 |
| Cure Time at 25° C. | hours | 48 |
| Heat Cure Time at 100° C. | minutes | 35 |
| Heat Cure Time at 125° C. | minutes | 20 |
| Heat Cure Time at 150° C. | minutes | 10 |
| Durometer Shore A | | 43 |

The PDMS film 4 was prepared by spin coating and then curing, as explained above with reference to FIGS. 2a-2d. Specifically, the PDMS mix 4a was poured over the microstructured inner surface 2a of a mineral glass first outer mold part 2 which had beforehand been treated with plasma, and then spin-coated thereon.

To achieve the desired film thickness of between 1 µm and 100 µm, the spin coating (i.e. spinning) speed and duration were both adjusted to reach the targeted thickness for the final cured film 4. By increasing the spinning speed, a plurality of films each with a thickness of between 10-100 µm were obtained, which proved to very well replicate the microstructure profile of the mineral glass inner surface at a high fidelity.

It may be noted that the high replication fidelity of the microstructure profile may also be achieved by controlling the PDMS viscosity, tweaking shrinkage and microstructure shape design, and/or by using a mask to selectively cure the PDMS and wash-off the uncured part afterwards.

The PDMS precursor film was further crosslinked after being mixed with the curing agent, and thus became a hydrophobic elastomeric film, which modulus/hardness was adjusted by varying the PDMS crosslinking degree. The Young modulus of the PDMS film was controlled by varying the curing agent weight ratio, and thus the crosslinking degree of the PDMS in the cured film.

It may be noted that depending on the size of the PDMS polymeric chain, the non-crosslinked PDMS may be almost liquid or semi-solid, in case of a low or high number of repeating units, respectively.

Then, ophthalmic lens substrates were manufactured by casting and curing in a mold cavity according to the principle of FIG. 1, by casting thermosetting lens substrates 6 of names Orma® (homopolymer of diethylene glycol bis(allyl carbonate), and "MR7", "MR8, "1.74" (polythiourethane).

The resulting lens substrates were easily demolded, and incorporated the replicated microstructure with a high fidelity, whilst the inner surface 2a of the mineral glass first outer mold part 2 was preserved, since it had been protected during the casting and curing steps by the film 4, which thus acted as a protective shield.

It is to be noted that the PDMS advantageously remained liquid at room temperature for many hours, even when mixed with the crosslinking agent, and that the PDMS was able to flow into the microstructure at high resolutions, also providing a precise control of the film thickness. With some optimization, it should therefore be possible to flow into microstructures of a few nanometers. Hence an easy and satisfactory moldability of the original microstructure.

It also to be noted that the PDMS film was easy to bond to the mineral glass of the first molding part 2, after this mineral glass had been treated with plasma, and that it provided an excellent releasability therefrom due to its low surface tension.

It is further to be noted that the PDMS was particularly advantageous, since it exhibits an excellent chemical resistance to many solvents, such as, but not limited to, methanol, glycerol, propanol, acetone and pyridine.

Example 2: Polyurethane Rubber-Based Molding Film Applied by Spin Coating

Raw material: polyurethane liquid rubber Clear Flex® 30, from Smooth-On, Inc.

Preparation of the polymeric solution: parts A and B of Clear Flex® 30 were first mixed at the ratio of 1:1 (volume/volume), then stirred for 3 minutes and degassed afterwards.

The polyurethane rubber film 4 was prepared by dropping the thus prepared polymeric solution on the mineral glass first outer molt part 2 and spin-coated as disclosed above with reference to FIGS. 2a-2c, to form a thin layer of between 10 µm and 100 µm, depending on the spin coater spinning speed. The thus prepared glass insert was put into an oven, to cure the polyurethane thin precursor layer 4a according to FIG. 2d, so as to obtain the film 4.

Example 3: Thiol-Ene Thermoset-Based Molding Film Applied by Spin Coating

Raw material: "NOA 61", from Norland products, which is a clear, colorless, liquid one-part photopolymer adhesive that was cured by exposure to UV light (See its detailed properties in table 3 below).

When fully cured, "NOA 61" had both a very good adhesion and solvent resistance. After aging at 50° C. for 12 hours, then UV cured, "NOA 61" was able to withstand temperatures from −150° ° C. to 125° C.

TABLE 2

| Solids | 100% |
| --- | --- |
| Viscosity at 25° C. | 300 cps |
| Refractive Index of Cured Polymer | 1.56 |
| Elongation at Failure | 38% |
| Modulus of Elasticity (psi) | 150,000 |
| Tensile Strength (psi) | 3,000 |
| Hardness - Shore D | 85 | application and curing of the polymeric solution: the steps of FIGS. 2a-2d were implemented as follows.

"NOA 61" was spin-coated at 4000 rpm for 30 s, with a final thickness of 60 µm.

The spin-coated solution was then UV-cured during 10 minutes under a high wattage UV lamp (Dymax® 5000EC of 400 W), at an average intensity of 48 mW/cm$^2$.

The cured film 4 was left for stabilization at 60° C. for 15 hours.

Example 4: Fluoropolymer-Based Molding Film Applied by Spin Coating

Raw material: THV 220G, from 3M.
Preparation of polymeric solution: THV 220G was dissolved in acetone.

The fluoropolymer film 4 was prepared by dropping the thus prepared polymeric solution on the mineral glass first outer mold part 2 and spin-coated as disclosed above with reference to FIGS. 2a-2c, to form a thin precursor layer for the film 4.

Acetone was evaporated during spin coating according to the solvent evaporation step of FIG. 2e, so that a thin layer of THV 220G was formed on the mineral glass first outer mold part 2, with a final thickness for the film 4 of between 10 µm and 100 µm.

Example 5: TPU-Based Molding Film Applied by Micro-Thermoforming

Raw material:
Dureflex® A4000, an aliphatic thermoplastic polyurethane (TPU), from Covestro.

Application of the TPU-based precursor layer:
Thin A4000-based precursor layers were heated to their softening point at 110° C., and then each compressed against the mineral glass first outer mold part 2 by pressurized nitrogen according to FIG. 5a-5c, and/or pulled against this mineral mold part 2 by vacuum according to FIGS. 6a-6c, so as to be deformed against the microstructure profile 2a on the mineral mold part 2.

Each TPU-based film 4 reached a final thickness of between 1 µm and 100 µm.

Example 6: PDMS-Based Molding Film Applied by Spray Coating

Raw material: Sylgard® 184, from Dow Corning.
Preparation of polymeric solution: Sylgard® 184 was too viscous to be used as it was. Several solvents, such as hexane, silicone fluid, or the Dow Corning "200 fluid", were separately used to dilute Sylgard® 184.

According to FIGS. 3a-3c, an airbrush with a medium nozzle was held above the mineral glass first outer mold part 2, and droplets of the PDMS solution were sprayed under compressed nitrogen.

Alternatively, the mineral glass first outer mold part 2 was rotated during spray coating, to achieve a more uniform thickness. A PDMS liquid film 4a was thus formed and its thickness was controlled particularly by spraying duration, pressure, rotation speed of the mold part 2.

The PDMS liquid film 4a was then cured under heat, and/or UV, to obtain the film 4 with a final thickness of between 1 µm and 100 µm.

Example 7: PDMS-Based Molding Film Applied by Dip Coating

Raw material: Hydroxy terminated PDMS (Mw=18000 g mol$^{-1}$), from Sigma Aldrich.

Preparation of polymeric solution: this PDMS-OH was dissolved in n-heptane and then the crosslinking agent (TEOS) and 0.2 wt % catalyst dibutyltin dilaurate were added to the polymeric solution. The polymeric mixture was stirred at room temperature for 30 min. and degassed under vacuum.

According to FIGS. 4a-4c, the mineral glass first outer mold part 2 was dipped into this PDMS-OH solution and withdrawn for a few cycles, until a liquid precursor film 4a was formed at the required thickness.

A solid hydrophobic film 4 was obtained after curing this liquid film 4a under heat and/or UV, with a a final thickness of between 1 µm and 100 µm.

Example 8: Hydrophobic Surface Treatment for a Polymeric Molding Film

Raw material: Ease Release® 200, from Smooth-On, Inc.
each of the above films 4 as applied over the mineral glass first outer mold part 2 according to the above examples 1-7, was further spray-coated with the Ease Release® 200, for achieving a better hydrophobic function (witnessed by a higher contact angle), so as to improve demolding of the thermoset optical article after casting and curing.

This mold release agent is thus particularly usable to be spray-coated on a fluoropolymer, but also on reactive polysiloxanes, PVAs (polyvinyl alcohols), waxes and silicone oils, in a non-limiting manner.

It is to be noted that this hydrophobic surface treatment process may also be applied to a hydrophilic or less hydrophobic film by another coating technique, such as spin coating or dip coating, to obtain the desired hydrophobic molding film.

The invention claimed is:

1. A composite mold for manufacturing a thermoset optical article which is usable as an ophthalmic lens substrate and which comprises a microstructured main surface, by casting a thermosetting material into a molding cavity, the composite mold comprising:
    a mineral first outer mold part having a first inner surface; and
    an organic molding film detachably bonded to the first inner surface and having a microstructured pattern configured to directly form said microstructured main surface after casting the thermosetting material in contact with the organic molding film,
    wherein the organic molding film is hydrophobic at least on said microstructured pattern, and has a thickness of between 10 nm and 100 µm.

2. The composite mold according to claim 1, wherein the organic molding film:
    exhibits a water contact angle greater than 100° at least on said microstructured pattern;
    and/or has a thickness of between 1 µm and 100 µm.

3. The composite mold according to claim 1, wherein the organic molding film is based on at least one polymer selected from elastomers, thermoplastic polymers and thermoset polymers, and wherein the organic molding film is of monolayer or multilayer type, being hydrophobic on said microstructured pattern and optionally also through the thickness of said organic molding film.

4. The composite mold according to claim 3, wherein the organic molding film is based on at least one crosslinked elastomer.

5. The composite mold according to claim 4, wherein the at least one crosslinked elastomer is selected from silicone rubbers, including two-part polydimethylsiloxanes (PDMS), and from polyurethane rubbers, including two-part liquid urethane rubbers.

6. The composite mold according to claim 3, wherein the organic molding film is based on at least one thermoset polymer.

7. The composite mold according to claim 6, wherein the at least one thermoset polymer is selected from thiol-ene thermosets, including one-part liquid photopolymer adhesives, and from thermoset polyurethanes.

8. The composite mold according to claim 3, wherein the organic molding film is based on at least one thermoplastic polymer.

9. The composite mold according to claim 8, wherein the at least one thermoplastic polymer is selected from fluorinated polymers, including terpolymers of tetrafluoroethylene, hexafluoropropylene and vinylidene fluoride, and from thermoplastic polyurethanes (TPU).

10. The composite mold according to claim 3, wherein the organic molding film has a Young modulus measured according to ASTM D882-12 of between 100 MPa and 4000 MPa.

11. The composite mold according to claim 1, wherein the mineral first outer mold part has said first inner surface which comprises a microstructure onto which a first face of the organic molding film is detachably bonded without an adhesive therebetween, the organic molding film conforming to the microstructure on the first face and having an opposite second face forming said microstructured pattern; and
    wherein the composite mold further comprises a mineral second outer mold part which has a second inner surface opposite to the first inner surface, the molding cavity being defined between the organic molding film and the second inner surface.

12. The composite mold according to claim 11, wherein the first inner surface of the mineral first outer mold part has said first inner surface which is concave, and wherein the thickness of the organic molding film ranges from $1/10$ to $1/100$ of the average amplitude of said microstructure of the mineral first outer mold part.

13. A method for manufacturing a thermoset optical article which is usable as an ophthalmic lens substrate and which comprises a microstructured main surface for example configured to control myopia, wherein the method comprises:
    a) casting a thermosetting material into a molding cavity of a composite mold according to claim 1, so that the thermosetting material contacts the organic molding film and a second inner surface of a mineral second outer mold part which is opposite to the first inner surface, without contacting said first inner surface;
    b) curing the thermosetting material cast in the molding cavity; and
    c) demolding the molded thermoset material obtained in step b), comprising releasing the molded thermoset material from the organic molding film, so that the microstructured pattern of the organic molding film directly forms the microstructured main surface of the obtained thermoset optical article.

14. The method according to claim 13, wherein the organic molding film resists attack during casting step a) from the thermosetting material, which is selected from:
    cycloolefin copolymers including ethylene/norbornene or ethylene/cyclopentadiene copolymers;
    homopolymers and copolymers of allyl carbonates of linear or branched aliphatic or aromatic polyols, including homopolymers of diethylene glycol bis(allyl carbonate),
    homopolymers and copolymers of (meth)acrylic acid and esters thereof, which are optionally derived from bisphenol A;
    homopolymers and copolymers of thio(meth)acrylic acid and esters thereof;
    homopolymers and copolymers of allyl esters which are optionally derived from bisphenol A or phthalic acids, and allyl aromatics including styrene;

copolymers of urethane and thiourethane;
homopolymers and copolymers of epoxy; and
homopolymers and copolymers of sulfide, disulfide and episulfide.

15. A method for obtaining a composite mold according to claim 1, wherein the method comprises:
   A) Providing a polymer composition which is either hydrophobic or coated with a hydrophobic surface layer and which is capable of forming the organic molding film to be detachably bonded to the mineral first outer mold part, the polymer composition being able to resist attack from the thermosetting material to be cast;
   B) Applying the polymer composition on the inner surface of the mineral first outer mold part, to form a precursor layer for the organic molding film; and
   C) Treating the applied precursor layer to form the organic molding film, which has said thickness of between 10 nm and 100 μm and a surface tension able to release therefrom the cast and cured thermoset optical article.

16. The method according to claim 15, wherein said inner face of the mineral first outer mold part is formed of mineral glass and comprises a microstructure onto which the organic molding film is conformingly bonded in steps B) and C), to form said microstructured pattern.

17. The method according to claim 16, wherein the polymer composition consists of a solution comprising a solvent and at least one polymer selected from elastomers, thermoplastic polymers and thermoset polymers, and wherein step B) comprises coating the solution on the inner surface of the mineral first outer mold part.

18. The method according to claim 17, wherein step C) comprises:
   crosslinking the precursor layer in case the at least one polymer is selected from elastomers and thermoset polymers; or
   evaporating the solvent, in case the at least one polymer is selected from thermoplastic polymers and is spin-coated in step B).

19. The method according to claim 16, wherein, in case the polymer composition is devoid of a solvent and when the at least one polymer is selected from thermoplastic polymers, steps B) and C) comprise micro-thermoforming the polymer composition using pressure and/or vacuum by compression against the microstructure of said inner face of the mineral first outer mold part.

* * * * *